(12) United States Patent
Shibata

(10) Patent No.: US 6,573,956 B1
(45) Date of Patent: Jun. 3, 2003

(54) LIQUID CRYSTAL DISPLAY

(75) Inventor: Kouichi Shibata, Kumamoto (JP)

(73) Assignee: Kabushiki Kaisha Advanced Display, Kumamoto (JP)

( * ) Notice: Subject to any disclaimer, the term of this patent is extended or adjusted under 35 U.S.C. 154(b) by 0 days.

(21) Appl. No.: 09/663,938

(22) Filed: Sep. 18, 2000

(30) Foreign Application Priority Data

Sep. 22, 1999 (JP) ............................................. 11-268192

(51) Int. Cl.⁷ .......................................... G02F 1/1335
(52) U.S. Cl. ............................ 349/65; 349/58; 349/60; 349/64; 349/62; 362/31
(58) Field of Search ............................. 349/65, 58, 62, 349/60, 64; 362/31

(56) References Cited

U.S. PATENT DOCUMENTS

| | | | | |
|---|---|---|---|---|
| 5,202,950 A | * | 4/1993 | Arego et al. | 385/146 |
| 5,886,759 A | * | 3/1999 | Mashino et al. | 349/65 |
| 5,999,685 A | * | 12/1999 | Goto et al. | 385/146 |
| 6,177,971 B1 | * | 1/2001 | Jung et al. | 349/60 |
| 6,273,577 B1 | * | 8/2001 | Goto et al. | 362/31 |

* cited by examiner

Primary Examiner—Kenneth Parker
Assistant Examiner—David Chung
(74) Attorney, Agent, or Firm—McDermott, Will & Emery

(57) ABSTRACT

A liquid crystal display capable of preventing luminescent lines generated at the perimeter edge in the display area and fastening firmly sheets such as diffusion sheets to a resin frame. A lightproof tape is taped to cover the perimeter edge of the diffusion sheet and the upper side of a resin frame to fasten firmly the sheets to the resin frame. The lightproof tape prevents luminescent lines generated at the perimeter edge of the diffusion sheet, or at the perimeter edge of the display area in a liquid crystal display device and also prevents slippage of the diffusion sheet and the sheets. Furthermore, the lightproof tape omits two conventional manufacturing processes of black-frame printing and double-faced tape taping and consequently lowers a production cost because of a simplified process, whereby only the process of taping the lightproof tape is required.

4 Claims, 2 Drawing Sheets

LIQUID CRYSTAL DISPLAY

BACKGROUND OF THE INVENTION

1. Field of the Invention

The present invention relates to a liquid crystal display having a back light unit capable of preventing luminescent line generated at the perimeter edge in the display area of a liquid crystal display and preventing slippage of sheets such as diffusion sheets by fastening firmly the sheets to a resin frame.

2. Description of the Related Art

FIG. 5 is an exploded perspective view showing a structure of a back light unit used as back light for a conventional liquid crystal display. FIG. 6 is a perspective view showing the back light unit after assembled. FIG. 7 is a cross-sectional view taken along the line C—C in FIG. 6. FIG. 8 is a cross-sectional view taken along the line D—D in FIG. 6. In those drawings, numeral 1 is a light guide plate that is a thin plate in shape and made of acrylic resin or the like, provided at the lower part of a liquid crystal display device (not shown). Numeral 2 is a diffusion sheet that diffuses rays of light from a light source evenly in a direction of the display side, provided along the upper surface of the light guide plate 1. The diffusion sheet 2 has a black-frame print portion 2a in the perimeter edge thereof. Numeral 3 is sheets provided between the diffusion sheet 2 and the light guide plate land comprised of, for example, a plurality of lens sheets, or a plurality of lens sheets and a plural of diffusion sheets. Numeral 4 is a reflecting sheet provided along the lower surface of the light guide plate 1. Numeral 5 is a lamp unit that is a light source, provided closely adjacent to at least one side surface of the light guide plate. Numeral 6 is a resin frame made of polycarbonate or the like for accommodating the light guide plate 1, the diffusing sheet 2, the sheets 3, the reflecting sheet 4 and so on. The lamp unit 5 is, as shown in FIG. 8, constructed to protect a cold cathode lamp 8 by surrounding or enclosing it with a lamp reflector 9 and a lamp cover 10. In addition, numeral 7 is a double-faced tape to fasten firmly the reverse side of the black-frame print portion 2a in the diffusion sheet 2 and the resin frame 6 together so that the diffusion sheet 2 and the sheets 3 may not slip.

In the conventional back light unit, the diffusion sheet 2 has a black-frame printed in its perimeter edge, and the double-face tape for preventing slippage of the diffusion sheet 2 and the sheets 3 is provided in the reverse side of the black-frame print portion 2a in the diffusion sheet 2. In some cases, the double-faced tape is provided on the longer side or on the shorter side of the resin frame 6 depending upon the use. All these are to prevent unevenness in luminance (hereinafter referred to as luminescent line), a phenomenon of rapidly intensified luminance arising at the perimeter edge of the diffusion sheet 2 that is a light emitting plane, that is, at the perimeter edge of the display area in a liquid crystal display device.

In the conventional liquid crystal display of above construction, the printing of a black-frame in the diffusion sheet 2 is used as the preventive measure against luminescent lines and taping of the double-faced tape 7 against slippage of the diffusion sheet 2 and sheets 3. In the diffusion sheet 2, however, an asperity work for forming roughness is applied onto its surface to diffuse rays of light, and therefore it is difficult to print the black-frame thereon when configuration of surface treatment or materials of the diffusion sheet 2 are not suited for printing. As a result, a problem exists in that adhesion of black-frame printing ink or paint to the diffusion sheet 2 is so insufficient that exfoliation of the print paint may take place, which affects negatively the performance of the liquid crystal display.

Further, with a recent increasing trend toward a larger effective display screen and a smaller frame around the screen, it has become more difficult to secure a sufficient space for the double-faced tape in the reverse side of the black-frame print portion 2a in the diffusion sheet 2.

Furthermore, in the manufacturing process of the conventional liquid crystal display, a problem exists in that the process is complicated and costly because the steps of printing the black-frames on the diffusion sheet 2 and taping the double-faced tape 7 are essentially required.

SUMMARY OF THE INVENTION

The present invention was made to solve the above-discussed problems and has an object of providing a liquid crystal display capable of preventing luminescent lines generated at the perimeter edge of the display area in the liquid crystal display device, capable of preventing slippage of the diffusion sheet and other sheets, and capable of being manufactured at a lower cost.

A liquid crystal display according to the invention comprises: a light guide plate that is a thin plate in shape and provided at a lower part of a liquid crystal display device; a light source provided closely adjacent to at least one side surface of the light guide plate; sheets including a plurality of diffusion sheets and lens sheets and provided along the upper surface of the light guide plate; a resin frame for accommodating the light guide plate and the sheets; and a lightproof tape taped on the perimeter edge of the top sheet of the sheets and on the upper side of the resin frame to fasten firmly the sheets and the resin frame together.

It is preferable that the diffusion sheet is provided on the top of the sheets.

It is preferable that the lightproof tape prevents luminescent lines generated at the perimeter edge of the display area of the liquid crystal display and, at the same time, prevents slippage of the sheets.

It is preferable that the lightproof tape is mainly made of polyester.

As described above, in the invention, by taping a lightproof tape on the perimeter edge of the top sheet of the sheets and on the upper side of a resin frame, it becomes possible to fasten firmly the sheets and the resin frame together and to prevent slippage of the sheets. At the same time, it also becomes possible to prevent luminescent lines generated at the perimeter edge of the display area in the liquid crystal display device. Furthermore, the method according to the present invention can omit two conventional steps of printing the black-frame and taping the double-faced tape, replacing these two steps with only one step of taping the lightproof tape, and consequently achieves a lower production cost as a result of a simplified manufacturing process.

Other objects, features and advantages of the invention will become more apparent in the course of the following description in connection with the accompanying drawings.

DESCRIPTION OF THE PREFERRED EMBODIMENT

Figure 1:
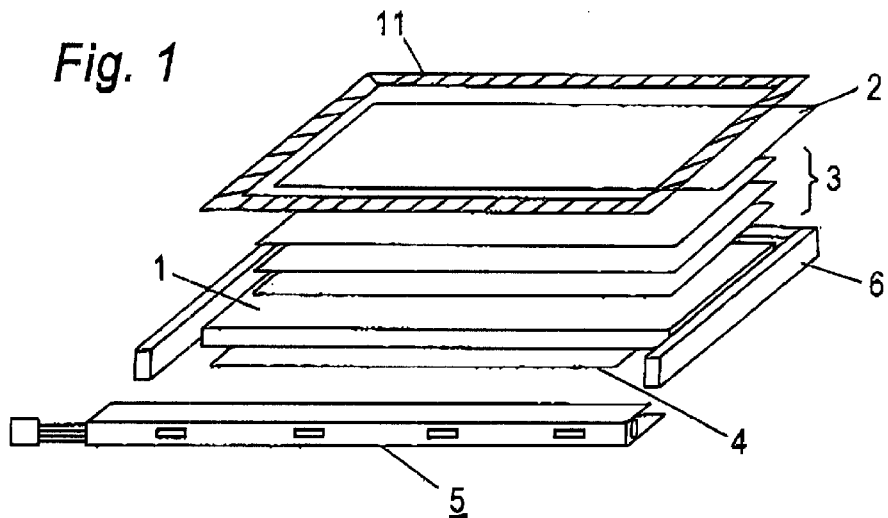
FIG. 1 is a an exploded perspective view showing a structure of a back light unit for a liquid crystal display according to an embodiment of the present invention.

Referring now to the drawings, a preferred embodiment of the present invention is hereinafter described.

Figure 2:
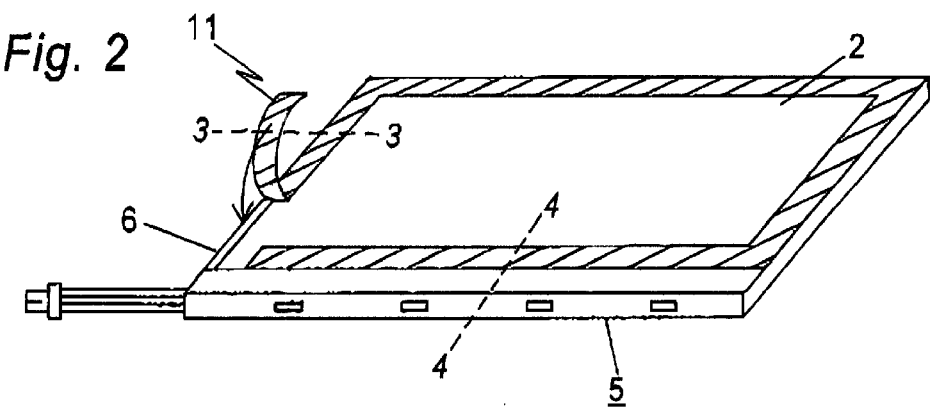
FIG. 2 is a perspective view showing the back light unit after assembled for a liquid crystal display according to the embodiment of the invention.
Figure 3:
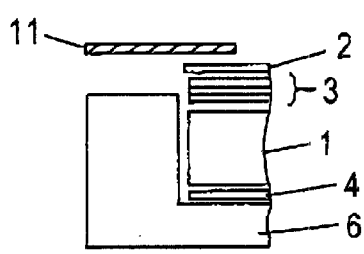
FIG. 3 is a cross-sectional view taken along the line A—A in FIG. 2.
Figure 4:
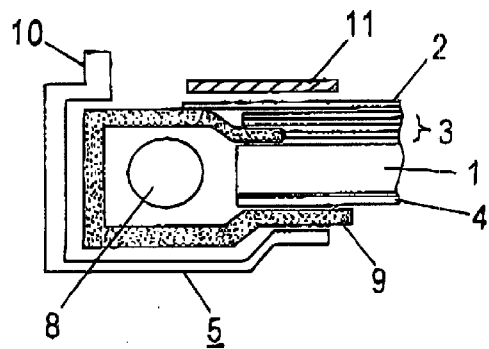
FIG. 4 is a cross-sectional view taken along the line B—B in FIG. 2.

FIG. 1 is an exploded perspective view showing a structure of a back light unit, used as back light for a liquid crystal display device, of a liquid crystal display according to an embodiment of the present invention. FIG. 2 is a perspective view showing the black light unit after assembled. FIG. 3 is a cross-sectional view taken along the line A—A in FIG. 2. FIG. 4 is a cross-sectional view taken along with the line B—B in FIG. 2.

In those drawings, numeral 1 is a light guide plate that is a thin plate in shape and made of acrylic resin or the like, provided at the lower part of a liquid crystal display device (not shown). Numeral 2 is a diffusion sheet that diffuses rays of light from a light source evenly in a direction of the display side, provided along the upper surface of the light guide plate 1. Numeral 3 is sheets provided between the diffusion sheet 2 and the light guide plate 1 and comprised of a plurality of sheets such as a plurality of lens sheets alone or a plurality of lens sheet and a plurality of diffusion sheets. Numeral 4 is a reflecting sheet provided along the lower surface of the light guide plate 1. Numeral 5 is a lamp unit that is a light source, provided closely adjacent to at least one side surface of the light guide plate. Numeral 6 is a resin frame made of polycarbonate or the like, accommodating the light guide plate 1, the diffusing sheet 2, sheets 3, the reflecting sheet 4 and so on. The lamp unit 5 is, as shown in FIG. 4, constructed to protect a cold cathode lamp 8 by enclosing it with a lamp reflector 9 and a lamp cover 10. In addition, numeral 11 is a lightproof tape made of polyester (PET) or the like, taped on the diffusion sheet 2 and the top sheet of the sheets 3. Note that, in the embodiment, the tape is taped on the perimeter edge of the diffusion sheet 2 and the upper side of the resin frame 6 to fasten firmly the diffusion sheet 2 and the resin frame 6 together.

In the embodiment of the present invention, as shown in FIG. 3, the lightproof tape 11 is taped to cover over the perimeter edge of the diffusion sheet 2 and the upper side of the resin frame 6 and to fasten firmly the diffusion sheet 2 and the resin frame 6 together. The lightproof tape 11 has following two functions: one is to prevent luminescent lines generated at the perimeter edge of the diffusion sheet 2, or at the perimeter edge of the display area of a liquid crystal display device, and the other is to prevent slippage of the diffusion sheet 2 and the sheets 3. As shown in the FIG. 4, the lightproof tape 11 is taped only on the edge of the diffusion sheet 2 at the side where the lump unit 5 is disposed. The dimensions and configurations of the diffusion sheet 2 and the sheets 3 may be selected in accordance with application (way of use), and exact positioning on the resin frame 6 where the lightproof tape 11 is taped may be conducted as necessary.

Figure 5:
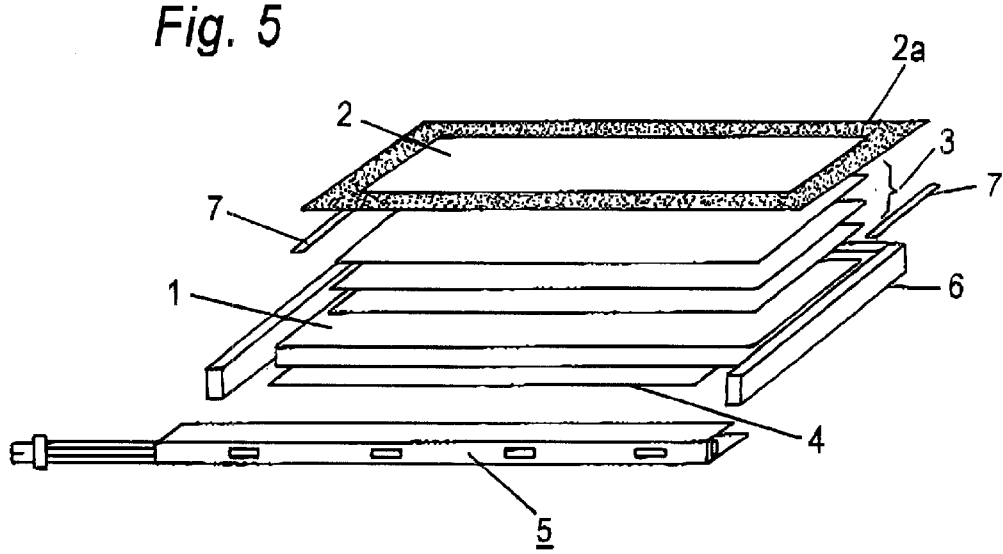
FIG. 5 is an exploded perspective view showing a structure of a back light unit according to a conventional liquid crystal display.
Figure 6:
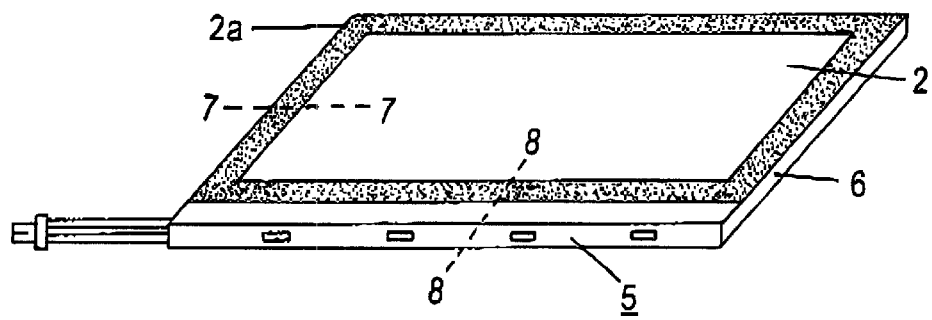
FIG. 6 is a perspective view showing the back light unit after assembled according to the conventional liquid crystal display.
Figure 7:
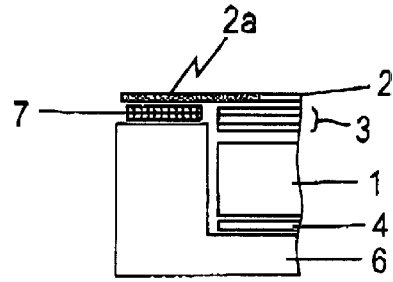
FIG. 7 is a cross-sectional view taken along the line C—C in FIG. 6.
Figure 8:
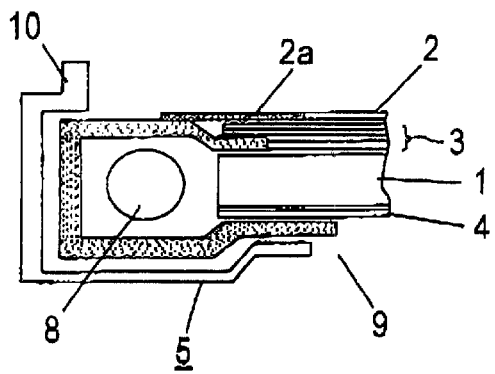
FIG. 8 is a cross-sectional view taken along the line D—D in FIG. 6.

In the embodiment of above construction, since the lightproof tape 11 provided at the perimeter edge of the display area of the liquid crystal display device, where luminescent lines tend to arises, it becomes possible to prevent the luminescent lines from arising without adopting a black-frame print portion 2a essentially provided on the diffusion sheet 2 (refer to FIG. 5) in the conventional liquid crystal display device. As a result, the negative effect on the liquid crystal display caused by exfoliation of the paint for black-frame printing, which has been a disadvantage incidental to the prior art, can be prevented. Furthermore, since the lightproof tape can fasten firmly the diffusion sheet 2 and the resin frame 6 together, the double-faced tape 7 employed conventionally (refer to FIG. 5) is no longer required. In the case of the conventional type double-faced tape 7, with a current trend toward a larger effective display screen and a smaller frame around the screen, it has been difficult to secure a space for the tape. On the contrary, in the case of the lightproof tape 11 according to the embodiment, it is comparatively easier to secure a space for the tape and to hold securely the diffusion sheet because the tape is applied on the top face of the diffusion sheet 2.

Furthermore, in the conventional manufacturing process of liquid crystal display, two steps of printing the black-frames on the diffusion sheet 2 and taping the double-faced tape 7 have been required. On the contrary, in the manufacturing process of liquid crystal display according to the embodiment, only one step of taping the lightproof tape is required while omitting the mentioned two conventional steps, and such a simplified manufacturing process eventually results in a lower production cost.

What is claimed is:

1. A liquid crystal display comprising:

a light guide plate that is a rectangular thin plate in shape and provided at a lower part of a liquid crystal display device;

a light source provided closely adjacent to one side surface of the light guide plate;

a sheet combination of at least one diffusion sheet and at least one lens sheet overlapping each other, the sheet combination provided along the upper surface of the light guide plate;

a resin frame for accommodating the light guide plate and the sheets; and lightproof tape taped only on a perimeter edge of a top surface of the sheet combination at one edge portion adjoining to the one side surface of the light guide plate, and taped on the perimeter edge of the top sheet of the sheet combination and on the upper side of the resin frame to fasten firmly the sheet combination and the resin frame together at other three edge portions adjoining to three remaining side surfaces of the light guide plate.

2. The liquid crystal display according to claim 1, wherein a top sheet of the sheet combination is a diffusion sheet.

3. The liquid crystal display according to claim 1, wherein the lightproof tape prevents luminescent lines generated at the perimeter edge of the display area of the liquid crystal display and, at the same time, prevents slippage of the sheet combination.

4. The liquid crystal display according to claim 1, wherein the lightproof tape is mainly made of polyester.

* * * * *